(12) United States Patent
Gu et al.

(10) Patent No.: US 9,195,295 B1
(45) Date of Patent: *Nov. 24, 2015

(54) AUDIO CODEC WITH AUDIO BUFFER TO STORE DECODED AUDIO DATA WHEREIN DECODING PROCESSOR ENTERS LOW POWER MODE DURING PLAYBACK

(71) Applicant: MARVELL INTERNATIONAL LTD., Hamilton (BM)

(72) Inventors: Qinwei Gu, Shanghai (CN); Yu Bai, Shrewsbury, MA (US)

(73) Assignee: MARVELL INTERNATIONAL LTD. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/285,700

(22) Filed: May 23, 2014

Related U.S. Application Data

(63) Continuation of application No. 13/083,767, filed on Apr. 11, 2011, now Pat. No. 8,738,824.

(60) Provisional application No. 61/326,521, filed on Apr. 21, 2010.

(51) Int. Cl.
*G06F 13/00* (2006.01)
*G06F 1/32* (2006.01)

(52) U.S. Cl.
CPC .................. *G06F 1/3234* (2013.01)

(58) Field of Classification Search
CPC ...................................... G06F 1/3234
USPC .............................................. 710/33, 52–54
See application file for complete search history.

(56) References Cited

U.S. PATENT DOCUMENTS

| | | | |
|---|---|---|---|
| 6,744,888 | B1 | 6/2004 | El-Kik et al. |
| 6,829,493 | B1 | 12/2004 | Hunzinger |
| 7,188,352 | B2 | 3/2007 | Nathan et al. |
| 7,486,608 | B1 | 2/2009 | Long et al. |
| 7,568,057 | B2 | 7/2009 | Lees et al. |
| 7,587,525 | B2 | 9/2009 | Dahan et al. |
| 7,616,627 | B2 | 11/2009 | Green et al. |
| 7,778,838 | B2 | 8/2010 | Sebestian et al. |
| 7,849,334 | B2 | 12/2010 | Juenemann et al. |
| 8,041,848 | B2 | 10/2011 | Conroy et al. |
| 8,270,389 | B2 | 9/2012 | Parnaby |
| 8,327,158 | B2 | 12/2012 | Titiano et al. |
| 2004/0081045 | A1 | 4/2004 | Won et al. |
| 2006/0187774 | A1 | 8/2006 | Koizumi et al. |
| 2011/0019578 | A1 | 1/2011 | Berg et al. |
| 2011/0066264 | A1* | 3/2011 | Cho ................................ 700/94 |

\* cited by examiner

*Primary Examiner* — Tammara Peyton

(57) ABSTRACT

Systems, methods, and other embodiments associated with a low power audio codec are described. According to one embodiment, an audio codec includes an audio buffer configured to store decoded audio data received from an application processor external to the audio codec. The application processor is configured to decode audio data in a RUN mode. The audio codec is configured to store, in the audio buffer, decoded audio data received from the application processor when the application processor is in IDLE mode and provide the stored decoded audio data to an audio device while the application processor is in a low power mode.

20 Claims, 4 Drawing Sheets

AUDIO CODEC WITH AUDIO BUFFER TO STORE DECODED AUDIO DATA WHEREIN DECODING PROCESSOR ENTERS LOW POWER MODE DURING PLAYBACK

CROSS REFERENCE TO RELATED APPLICATIONS

This application is a continuation of U.S. patent application Ser. No. 13/083,767, filed on Apr. 11, 2011 now U.S. Pat. No. 8,738,824 claims the benefit of U.S. provisional application Ser. No. 61/326,521 filed on Apr. 21, 2010, which are hereby wholly incorporated by reference.

BACKGROUND

Consumer demand for longer playback time on battery operated audio devices like cellular phones and PDAs is ever increasing. A typical playback time requirement for these types of devices is currently around 50 hours on a single battery charge. It is expected that minimum playback time requirements will soon increase to 100 hours.

SUMMARY

In one embodiment an apparatus includes an audio codec. The audio codec includes an audio buffer configured to store decoded audio data received from an application processor external to the audio codec. The application processor is configured to decode audio data in a RUN mode. The audio codec is configured to store, in the audio buffer, decoded audio data received from the application processor when the application processor is in IDLE mode and provide the stored decoded audio data to an audio device while the application processor is in a low power mode. The application processor consumes less power in low power mode than in IDLE mode and less power in IDLE mode than RUN mode.

In another embodiment, a system includes an application processor and an audio codec that is external to the application processor. The application processor is configured to operate in a RUN mode, an IDLE mode, and a low power mode, such that the application processor consumes less power in IDLE mode than in RUN mode, and less power in low power mode than in IDLE mode. The application processor includes an audio data decoder configured to decode audio data while the application processor is in RUN mode. The application processor includes an output buffer configured to, while the application processor is in IDLE mode, i) store the decoded audio data and ii) output the decoded audio data. The audio codec includes an audio buffer configured to store decoded audio data received from the output buffer while the application processor is in IDLE mode. The audio codec is configured to process the decoded audio data stored in the audio buffer and to provide an audio signal derived from the decoded audio data to an audio device while the application processor is in low power mode.

In another embodiment, a method for an application processor includes decoding audio data in a RUN mode and entering a low power mode while an audio codec external to the application processor provides an audio signal derived from the decoded audio data to an audio device. While in low power mode, direct memory access to the audio codec by the application processor is not allowed.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are examples of systems, methods, and other embodiments associated with reducing power consumption of an audio device during audio playback. In one embodiment, an audio codec includes an audio buffer that stores decoded audio data for processing by the audio codec while a processor that decoded the audio data is in a low power mode. The audio codec may also include an independent clock to provide timing signals to the audio codec when the processor clocks are not enabled. An audio codec with these features enables the processor to be placed in a low power consumption mode while the audio codec is processing decoded audio data stored in the audio buffer and providing the processed audio data as an audio signal to the audio device.

Figure 1A:
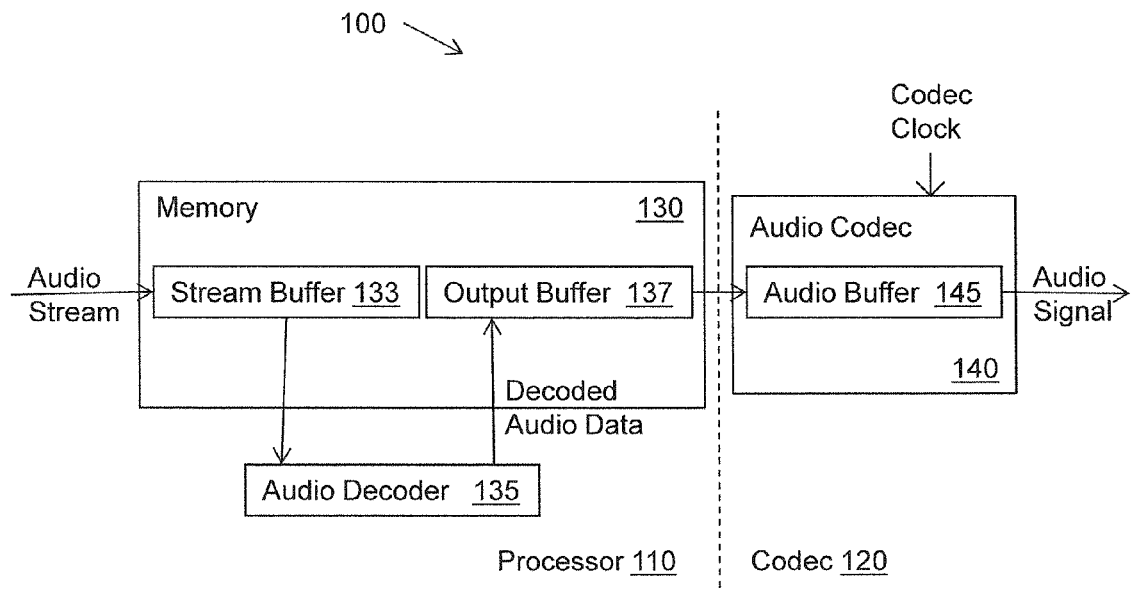
FIGS. 1A and 1B illustrate one embodiment of an apparatus associated with a low power audio codec.
Figure 1B:
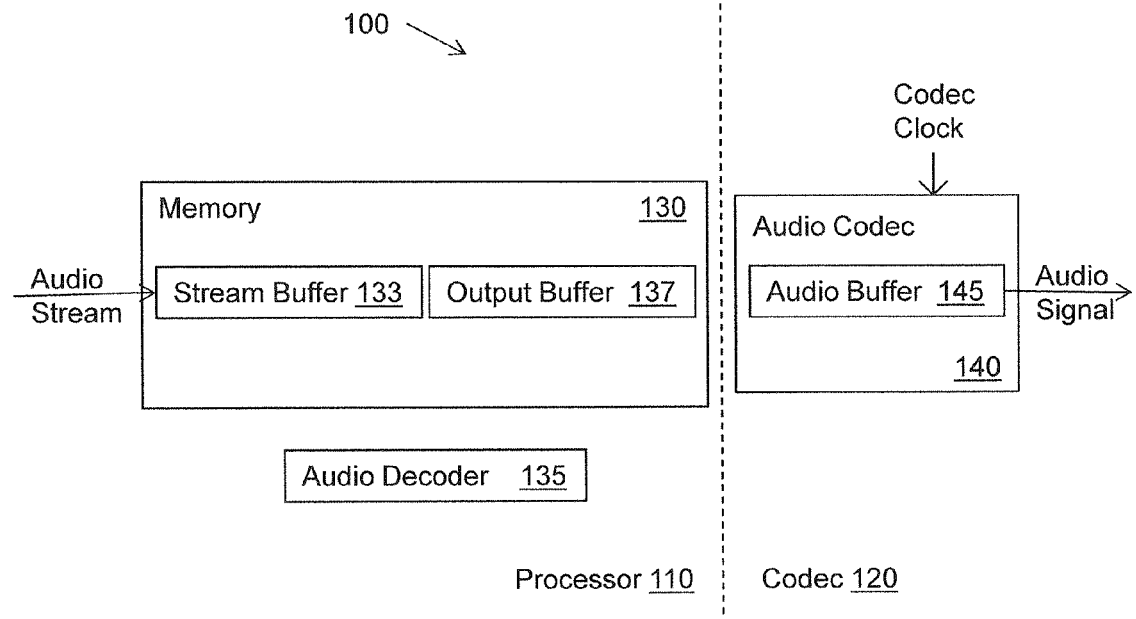

With reference to FIGS. 1A and 1B, one embodiment of an audio playback apparatus 100 is shown that includes a processor 110 and a codec 120. The processor 110 provides decoded audio data to the codec 120. In turn, the audio codec 120 processes the decoded audio data and outputs an audio signal for playback by the audio playback apparatus 100.

Referring now to FIG. 1A, in portions of playback operation of the audio playback apparatus, the processor 110 receives an encoded audio stream from external memory (e.g., storage card) and temporarily stores the audio stream in one or more stream buffers 133. The processor 110 includes an audio decoder 135 (e.g., Windows Media Player) that decodes the audio stream and stores the resulting decoded audio data in one or more output buffers 137. In one embodiment, the output buffer 137 has a memory capacity of 32 KB. During the decoding operation the processor 110 is in RUN mode, meaning that processor components, clocks, and peripherals are in normal operation. Of course, the processor 110 is consuming a maximum or near maximum amount of power while in RUN mode.

The processor 110 provides the decoded audio data to the codec 120 by transmitting the decoded audio data to a low power audio codec 140. The low power audio codec 140 stores the decoded audio data in an audio buffer 145. In one embodiment the audio buffer 145 has a memory capacity of 8 KB. During this transmission of decoded audio data, the processor 110 can either be in RUN mode (while decoding audio data) or in IDLE mode (while transmitting decoded audio data to the low power audio codec 140). In one embodiment, in IDLE mode processor clocks are gated while system bus, main memory, and external peripherals operate normally. The amount of power consumed by the processor 110 during IDLE mode is less than during RUN mode, however, in IDLE mode, power is consumed by the processor to transmit the decoded audio data.

FIG. 1B illustrates operation of the audio playback apparatus 100 once the audio buffer 145 has been filled with decoded audio data from the processor's output buffer 137. The processor 110 enters a low power mode in which direct memory access is not allowed. In some embodiments, the low power mode is a STANDBY mode in which a processor core and peripherals are stopped in low leakage state with context retained. The low power audio codec 140 continues to provide the audio signal for playback by processing the decoded audio data stored in the audio buffer 145. To facilitate operation of the codec 120 while the processor 110 is in a low power mode in which processor clocks may not be operating, the codec 120 may include a codec clock that operates independently of processor clocks (not shown) to provide timing signals to the low power audio codec 140.

The audio buffer 145 allows the low power audio codec 140 to store decoded audio data for future processing. Thus, the processor 110 can enter a low power mode while the audio codec 140 continues to provide the audio signal. This results in a reduction in power consumption as compared to conventional audio codecs that do not include an audio buffer. In audio playback devices that include conventional audio codecs, the processor 110 does not enter a low power mode in which direct memory access is not allowed because decoded audio data is continuously being supplied to the audio codec by the processor. Thus, with a conventional audio codec, a processor will cycle between RUN (decoding audio data) and IDLE (transmitting decoded audio data to the audio codec) modes.

Figure 2:
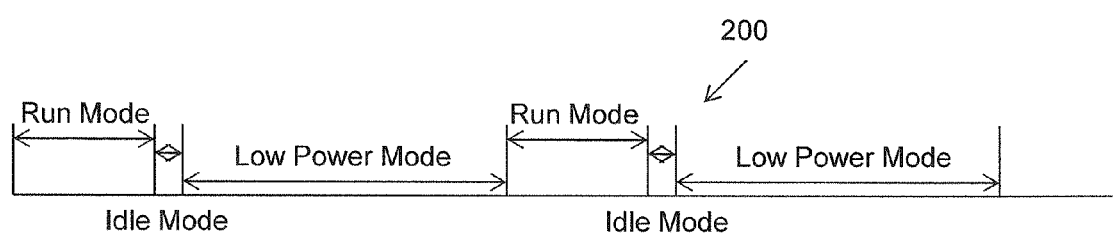
FIG. 2 is a timeline that illustrates the operation one embodiment of a low power audio codec.

FIG. 2 depicts a timeline 200 that illustrates operation of one embodiment of an audio playback apparatus that includes a low power audio codec. The timeline 200 shows two cycles of processor operation modes during audio playback. The relative amount of time in each mode shown in FIG. 2 is approximate and will vary depending on operational parameters like processor operating frequency. As already discussed above, the processor operates in RUN mode when decoding audio data and storing the data in its output buffer. At the same time, decoded audio data is being transmitted to the audio codec for storage in the audio buffer. After the processor has decoded sufficient audio data to fill the output buffer, the processor transitions to IDLE mode while transmitting decoded audio data to the audio codec.

Once the audio buffer in the audio codec is full, the processor can transition into a low power mode. In one embodiment, this transition from IDLE to low power mode occurs after a predetermined IDLE time threshold has occurred. In one embodiment, the predetermined IDLE time threshold is approximately 3 milliseconds. An optimal IDLE time threshold may be determined based on measurement of the amount time the processor spends in IDLE mode in various playback scenarios. The amount of time required to enter and exit the low power mode should also be considered in determining an appropriate IDLE time threshold.

As can be seen in FIG. 2, the audio buffer in the audio codec allows the processor to spend a significant amount of time in low power mode during audio playback. This results in significant reduction in power consumption as compared to conventional audio codec devices in which the processor remains in IDLE mode to continuously transfer decoded audio data to the audio codec. For an audio playback in which the processor operates at 60 Hz, transitioning to low power mode after 3 milliseconds allows the processor to operate in low power mode approximately one third of the time instead of spending that time in IDLE mode. Assuming 1000 mA-Hr battery capacity, for a typical audio device this results in approximately twelve additional hours of audio playback on a single battery charge.

Figure 3:
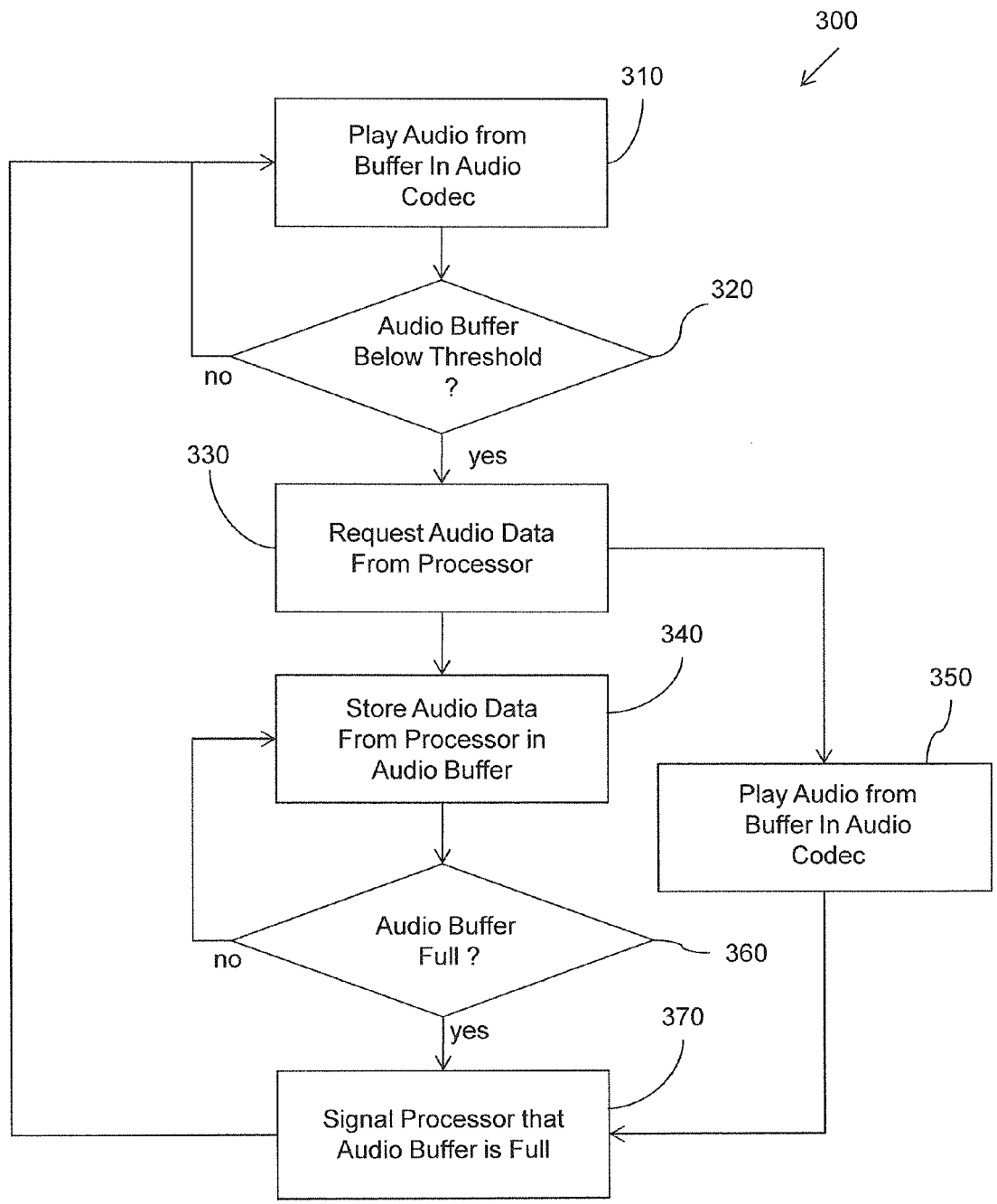
FIG. 3 illustrates one embodiment of a method associated with a low power audio codec.

FIG. 3 is a flow diagram outlining a method 300 according to which one embodiment of an audio codec with an audio buffer operates. At 310 the audio codec sends an audio signal to be played by an audio device. At 320 the method includes determining if an amount of decoded audio data stored in the audio buffer on the audio codec is below a threshold amount. If the audio buffer still contains sufficient decoded audio data, the method continues to provide the audio signal for the audio device to play. If the amount of decoded data in the audio buffer is below the threshold, at 330 the method requests decoded audio data from the processor while continuing to provide the audio signal for the audio device to play at 350. At 340, decoded audio data from the processor is stored in the audio buffer. At 360, the method determines if the audio buffer is full. If the audio buffer is not full, the method continues to store audio data in the audio buffer at 340. Once the audio buffer is full, at 370 a signal is sent to the processor to alert the processor that the audio buffer is full. The processor can then transition to low power mode.

Figure 4:
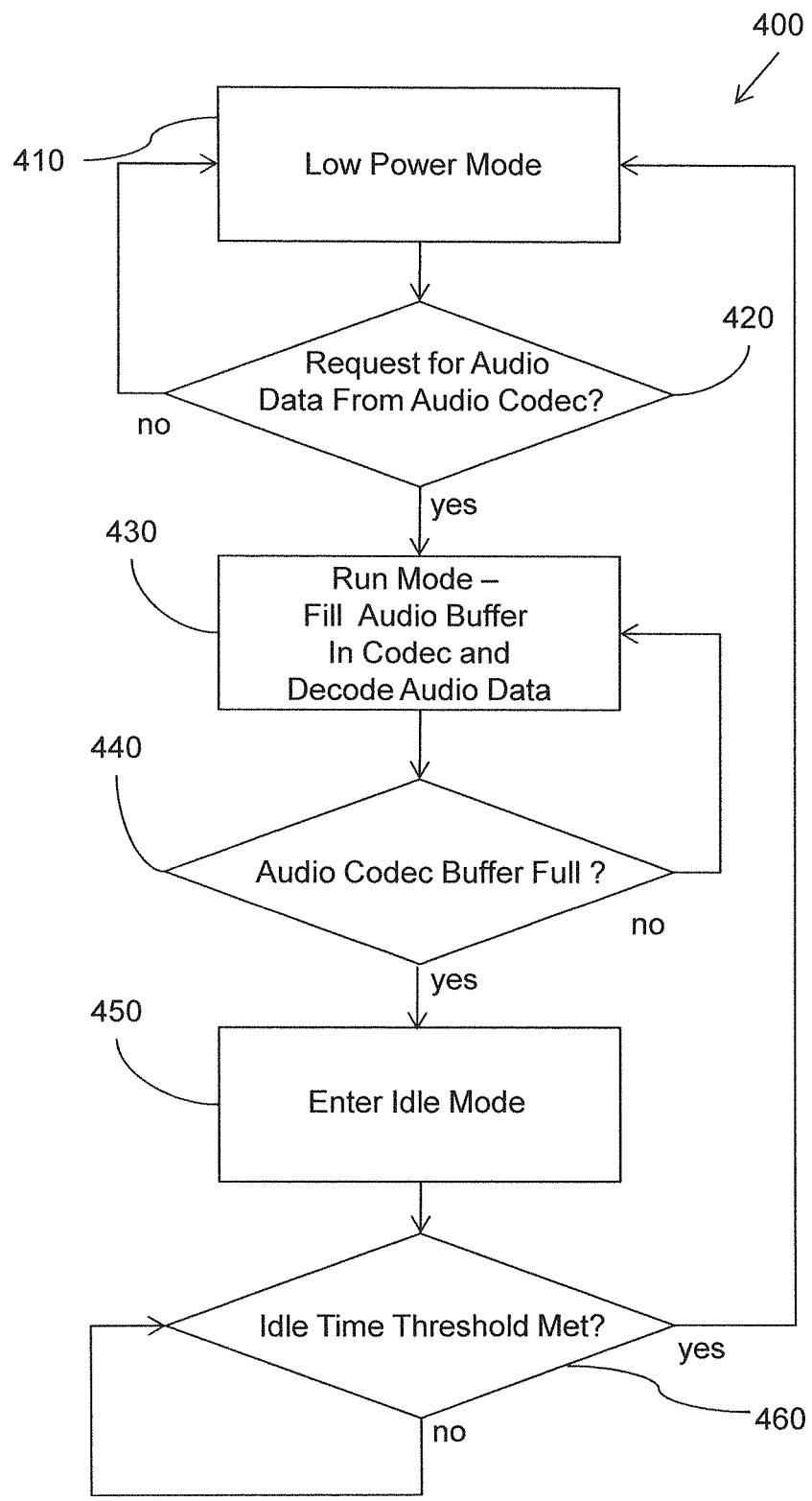
FIG. 4 illustrates one embodiment of a method associated with a low power audio codec.

FIG. 4 is a flow diagram outlining an example of a method 400 for providing decoded audio data to an audio codec having an audio buffer. At 410 the processor is in low power mode in which direct memory access is not allowed and power consumption is minimal. At 420, the method determines if the audio codec is requesting decoded audio data and if not, the processor remains in low power mode at 410. If the audio codec is requesting decoded audio data, at 430 the processor enters RUN mode and begins to decode and transmit audio data to the audio codec to fill the audio buffer.

At 440 the method determines whether the audio buffer is full. If the audio buffer is not full, the method continues to fill the audio buffer at 430. If the audio buffer is full, the processor enters IDLE mode at 450. At 460, the method determines if the IDLE time threshold has been met. Once the IDLE time threshold has been met, the processor enters low power mode at 410.

An audio playback device that includes an audio codec with an audio buffer is able to enter a low power mode while playing audio. This reduces device power consumption and increases playback time.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

Previous Disclaimers Rescinded

Applicant respectfully informs the Patent Office that the present disclosure is a broadening continuation. Applicant rescinds all disclaimers made during the prosecution of the parent application(s), which may have included statements or amendments that may have disclaimed scope. Accordingly, the previous disclaimers, and the prior art that it was made to avoid, may need to be and should be re-visited.

What is claimed is:

1. An audio codec apparatus, comprising:
   an audio codec comprising
      an audio buffer configured to store decoded audio data received from an application processor external to the audio codec, wherein the application processor is configured to decode audio data in a RUN mode, wherein the audio codec is configured to play the decoded audio data without performing decoding operations on the decoded audio data; and
      wherein the audio codec is configured to:
         store, in the audio buffer, decoded audio data received from the application processor when the application processor is in IDLE mode; and
         provide the stored decoded audio data to an audio device while the application processor is in a low power mode such that the application processor is not decoding audio data and the application processor is not transmitting audio data to the audio codec; and
         further wherein the application processor consumes less power in low power mode than in IDLE mode and less power in IDLE mode than RUN mode.

2. The apparatus of claim 1, further comprising an audio codec clock that provides timing signals to the audio codec; wherein the audio codec clock operates independently of a clock that provides timing signals to the application processor.

3. The apparatus of claim 1, wherein the audio codec is configured to request decoded audio data from the application processor when an amount of decoded audio data stored in the audio buffer falls below a threshold.

4. The apparatus of claim 1 wherein the audio codec is configured to provide an audio buffer full signal to the application processor when the audio buffer is full of decoded audio data received from the application processor.

5. The apparatus of claim 1, further comprising the application processor, and wherein the application processor is configured to:
   while in IDLE mode, receive an audio buffer full signal from the audio codec; and
   in response to the audio buffer full signal, enter low power mode until receiving a request for decoded audio data from the audio codec.

6. The apparatus of claim 5 wherein the application processor is configured to remain in IDLE mode for a predetermined threshold duration of time prior to entering low power mode.

7. A system, comprising:
   an application processor configured to operate in a RUN mode, an IDLE mode, and a low power mode, wherein the application processor consumes less power in IDLE mode than in RUN mode, and less power in low power mode than in IDLE mode, the application processor comprising:
      an audio data decoder configured to decode audio data while the application processor is in RUN mode; and
      an output buffer configured to, while the application processor is in IDLE mode, i) store the decoded audio data and ii) output the decoded audio data;
   an audio codec, external to the application processor, comprising:
      an audio buffer configured to store decoded audio data received from the output buffer while the application processor is in IDLE mode;
      wherein the audio codec is configured to i) process the decoded audio data stored in the audio buffer and ii) provide an audio signal derived from the decoded audio data to an audio device while the application processor is in low power mode, such that the application processor is not decoding audio data and the application processor is not transmitting audio data to the audio codec; and
      further wherein the audio codec is configured to play the decoded audio data without performing decoding operations on the decoded audio data.

8. The system of claim 7, wherein the audio codec further comprises an audio codec clock that provides timing signals to the audio codec; wherein the audio codec clock operates independently of the one or more application processor clocks.

9. The system of claim 7, wherein a storage capacity of the output buffer is at least two times the storage capacity of the audio buffer.

10. The system of claim 7, wherein the application processor is configured to:
    while in IDLE mode, receive an audio buffer full signal from the audio codec; and
    in response to the audio buffer full signal, enter a low power mode until receiving a request for decoded audio data from the audio codec.

11. The system of claim 10, wherein the application processor is configured to remain in IDLE mode for a predetermined threshold duration of time prior to entering low power mode.

12. The system of claim 10, wherein the application processor is configured to leave low power mode and enter RUN mode upon receiving the request for audio data from the audio codec.

13. A method, comprising, with an application processor:
    decoding audio data in a RUN mode;
    entering a low power mode while an audio codec external to the application processor provides an audio signal derived from the decoded audio data to an audio device, such that the application processor is not decoding audio data and the application processor is not transmitting audio data to the audio codec while the audio codec provides the audio signal to the audio device; and wherein while the application processor is in low power mode, direct memory access to the audio codec by the application processor is not allowed.

14. The method of claim 13, further comprising, with the application processor:

while in the RUN mode, decoding the audio data and storing the decoded audio data in an output buffer;

entering an IDLE mode when the output buffer is full of decoded audio data and while in IDLE mode, providing the decoded audio data stored in the output buffer to the audio codec for storage in an audio buffer in the audio codec;

entering low power mode in response to receiving an audio buffer full signal from the audio codec; and wherein less power is consumed by the application processor while operating in IDLE mode than in RUN mode, and less power is consumed while operating in low power mode than in IDLE mode.

15. The method of claim 14, comprising remaining in IDLE mode for a predetermined threshold duration of time prior to entering low power mode.

16. The method of claim 13, comprising leaving low power mode and entering RUN mode upon receiving a request for audio data from the audio codec.

17. The method of claim 13, comprising
with the audio codec:
processing, decoded audio data stored in the audio buffer; and
providing the processed decoded audio data to an audio device as an audio signal while the application processor is in low power mode.

18. The method of claim 17 comprising, with the audio codec, requesting decoded audio data from the application processor when an amount of decoded audio data stored in the audio buffer falls below a threshold.

19. The method of claim 17 comprising, with the audio codec, storing decoded audio data received from the application processor in the audio buffer.

20. The method of claim 17 comprising, with the audio codec, providing an audio buffer full signal to the application processor when the audio buffer is full of decoded audio data received from the application processor.

* * * * *